United States Patent
Hammerschmidt et al.

(10) Patent No.: US 10,749,568 B2
(45) Date of Patent: Aug. 18, 2020

(54) MULTIBAND BLUETOOTH

(71) Applicant: Apple Inc., Cupertino, CA (US)

(72) Inventors: Joachim S. Hammerschmidt, Mountain View, CA (US); Robert G. Lorenz, Menlo Park, CA (US); Tad J. Dreier, Castro Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/674,397

(22) Filed: Aug. 10, 2017

(65) Prior Publication Data

US 2018/0048350 A1 Feb. 15, 2018

Related U.S. Application Data

(60) Provisional application No. 62/373,273, filed on Aug. 10, 2016.

(51) Int. Cl.
| | |
|---|---|
| *H04B 1/7156* | (2011.01) |
| *H04W 72/04* | (2009.01) |
| *H04W 4/80* | (2018.01) |
| *H04B 1/713* | (2011.01) |

(52) U.S. Cl.
CPC ........... *H04B 1/7156* (2013.01); *H04B 1/713* (2013.01); *H04W 4/80* (2018.02); *H04W 72/048* (2013.01); *H04B 2001/71563* (2013.01); *H04B 2201/694* (2013.01); *H04B 2201/71346* (2013.01)

(58) Field of Classification Search
CPC ........ H04B 1/7156; H04B 2001/71563; H04B 2201/694; H04B 2201/71346; H04W 4/008; H04W 72/048

USPC .......................................................... 375/133
See application file for complete search history.

(56) References Cited

U.S. PATENT DOCUMENTS

| | | | | |
|---|---|---|---|---|
| 2014/0269468 | A1* | 9/2014 | Jia | H04W 24/02 370/311 |
| 2015/0304814 | A1* | 10/2015 | Pandey | H04W 4/023 455/456.2 |
| 2016/0164725 | A1* | 6/2016 | Wu | H04W 4/008 713/168 |
| 2016/0183282 | A1* | 6/2016 | Balaban | H04W 4/021 370/329 |
| 2016/0309269 | A1* | 10/2016 | Peters | H04N 21/44227 |
| 2017/0006483 | A1* | 1/2017 | Attanasio | H04L 67/125 |
| 2017/0026505 | A1* | 1/2017 | Yoshimura | H04M 1/72519 |
| 2017/0033461 | A1* | 2/2017 | Mohajer Jasebi | H01Q 5/385 |
| 2017/0134882 | A1* | 5/2017 | Kao | H04W 4/008 |
| 2017/0223615 | A1* | 8/2017 | Lee | H04W 36/03 |
| 2017/0318617 | A1* | 11/2017 | Wietfeldt | H04L 67/104 |
| 2017/0339731 | A1* | 11/2017 | Vankieken | H04W 76/023 |

* cited by examiner

*Primary Examiner* — Hirdepal Singh
(74) *Attorney, Agent, or Firm* — Dickinson Wright RLLP

(57) ABSTRACT

An electronic device that communicates with a second electronic device using adaptive frequency hopping across different spectral bands is described. An integrated circuit in the electronic device includes processing logic that determines an adaptive spectral map that specifies channels across multiple spectral bands. During communication with a second electronic device that includes a second integrated circuit using a communication protocol (such as Bluetooth or Bluetooth Low Energy), the integrated circuit selects channels in the adaptive spectral map, where selection can be based on a predefined frequency-hopping sequence.

18 Claims, 12 Drawing Sheets

MULTIBAND BLUETOOTH

CROSS-REFERENCE TO RELATED APPLICATIONS

The present application claims the benefit of U.S. Provisional Patent Application No. 62/373,273, entitled "MULTIBAND BLUETOOTH" filed Aug. 10, 2016, the content of which is incorporated by reference herein in its entirety for all purposes.

FIELD

The described embodiments relate, generally, to wireless communications among electronic devices in a wireless personal area network (WPAN), including electronic devices and techniques for communicating using multiband Bluetooth.

BACKGROUND

Many electronic devices communicate with each other using wireless communication, such as in a wireless personal area network (WPAN) based on a communication protocol that is compatible with Bluetooth® (from the Bluetooth Special Interest Group in Kirkland, Washington). Bluetooth often involves short-distance wireless communication at frequencies in the unlicensed Industrial, Scientific and Medical (ISM) 2.4 GHz frequency band.

However, because of the popularity of Bluetooth and coexistence with other communication protocols that use the 2.4 GHz frequency band (such as an Institute of Electrical and Electronics Engineers or IEEE 802.11 standard, which is sometimes referred to as 'Wi-Fi'), there can be congestion and/or interference in the 2.4 GHz frequency band. The congestion can degrade communication performance, and thus may frustrate users of the electronic devices and can degrade user experience.

SUMMARY

Some embodiments relate to an electronic device that includes an integrated circuit that is communicatively coupled to an antenna via one or more nodes. The integrated circuit includes processing logic that determines an adaptive spectral map that specifies channels across different spectral bands. Subsequently, during communication with a second electronic device that includes a second integrated circuit using a communication protocol, the integrated circuit selects channels in the adaptive spectral map based at least in part on a predefined frequency-hopping sequence.

The spectral bands may include a first spectral band (e.g., 2.4 GHz) and a second spectral band (e.g., 5 GHz), and the integrated circuit may include a first communication circuit that communicates with the second integrated circuit in the first spectral band and a second communication circuit that communicates with the second integrated circuit in the second spectral band.

Moreover, the integrated circuit may revert to communicating with the second integrated circuit in one of the spectral bands using the communication protocol when a condition is detected or occurs. In particular, the condition may include: when the second integrated circuit does not support frequency hopping across the spectral bands; a communication-performance metric associated with the communication with the second integrated circuit; dynamic frequency selection information; a result of a comparison of a predefined value and a communication-performance metric during the communication with the second integrated circuit; when a connection with the second integrated circuit has not be established yet; and/or when the connection with the second integrated circuit is lost.

In some embodiments, the communication protocol is compatible with Bluetooth.

Furthermore, the processing logic may determine the adaptive spectral map based on: a link state, spectral utilization information and host information about the integrated circuit or the electronic device, and/or a wireless environment that includes the electronic device and the second electronic device.

Additionally, at least one of the channels may be in a first spectral band that is used by legacy integrated circuits that do not support frequency hopping across two different spectral bands.

In some embodiments, the integrated circuit receives, from the second integrated circuit, information specifying one or more recommended channels, and the processing logic determines the adaptive spectral map, including reference to the recommended channels.

Moreover, the integrated circuit may provide, to the second integrated circuit, the adaptive spectral map along with information that specifies a start time when the adaptive spectral map is to be used during communication between the integrated circuit and the second integrated circuit.

Furthermore, the integrated circuit may: provide a link margin probe request to the second electronic device to assess a suitability of a spectral band for inclusion in the spectral bands; and receive, from the second electronic device, a link margin probe response with feedback about the suitability of the spectral band.

The electronic device may include the antenna. In addition, a volume in the electronic device available for the antenna may be approximately equal to or less than one quarter of wavelengths in the spectral bands.

Other embodiments provide the interface circuit in the electronic device or the second interface circuit in the second electronic device.

Other embodiments provide a computer-program product for use with the interface circuit in the electronic device or the second interface circuit in the second electronic device. This computer-program product includes instructions for at least some of the aforementioned operations performed by the interface circuit in the electronic device or the second interface circuit in the second electronic device.

Other embodiments provide a method for communicating with the second electronic device. The method includes at least some of the aforementioned operations performed by the interface circuit in the electronic device or the second interface circuit in the second electronic device. In particular, the integrated circuit in the electronic device may frequency hop across two or more spectral bands based on a predetermined adaptive spectral map that specifies channels across the two or more spectral bands. The interface circuit may communicate frames compatible with the communication protocol in the channels.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Figure 1:
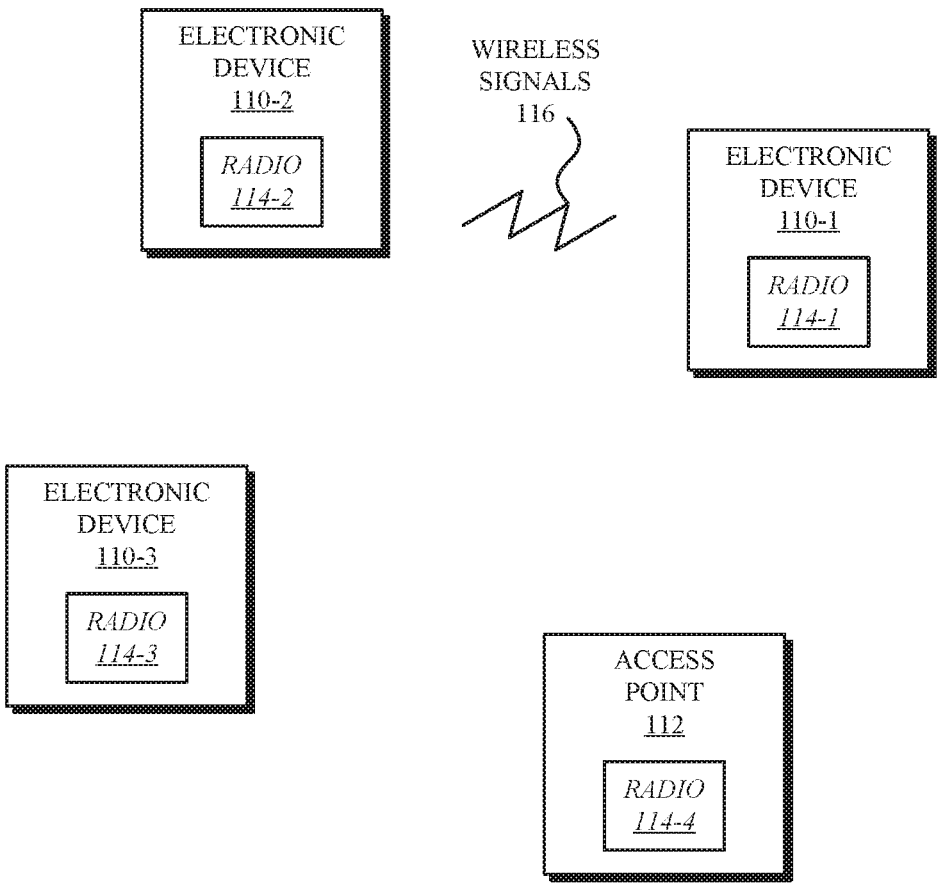
FIG. 1 is a block diagram illustrating an example of electronic devices communicating wirelessly.

Table 1 provides an example of an adaptive spectral map.

Table 2 provides an example of an update to an adaptive spectral map.

Table 3 provides examples of a link margin probe request, a link margin probe, and a link margin probe response.

Table 4 provides an example of the information in a spectrum classification report.

Note that like reference numerals refer to corresponding parts throughout the drawings. Moreover, multiple instances of the same part are designated by a common prefix separated from an instance number by a dash.

DETAILED DESCRIPTION

An electronic device that communicates with a second electronic device using adaptive frequency hopping across different spectral bands is described. An integrated circuit in the electronic device includes processing logic that determines an adaptive spectral map that specifies channels associated with the spectral bands. During communication with a second electronic device, which includes a second integrated circuit, using a communication protocol (such as Bluetooth or Bluetooth Low Energy), the integrated circuit selects channels in the adaptive spectral map based at least in part on a predefined frequency-hopping sequence.

By determining the adaptive spectral map and facilitating communication in different spectral bands, the communication technique may reduce congestion and interference when communicating with the second electronic device. Moreover, this communication technique may facilitate coexistence with other communication protocols. Consequently, the communication technique may improve the communication performance, and thus may decrease user frustration, and therefore may increase customer satisfaction.

Note that the communication technique may be used during wireless communication between electronic devices in accordance with a communication protocol, such as: Bluetooth or Bluetooth Low Energy (from the Bluetooth® Special Interest Group in Kirkland, Wash.), or Apple Wireless Direct Link (AWDL) (from Apple in Cupertino, Calif.). Bluetooth is used as an illustrative example in the discussion that follows. However, the communication technique may also be used with a wide variety of other communication protocols, and in electronic devices (such as electronic devices and, in particular, mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.). Moreover, the electronic device can communicate via: a wireless wide area network (WWAN), a wireless metro area network (WMAN), a wireless local area network (WLAN), near-field communication (NFC), a data network communication protocol, and/or other present or future developed communication protocols.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network. In some embodiments, the client device can be any electronic device that is capable of communicating via a WLAN technology, e.g., in accordance with a WLAN communication protocol.

In some embodiments, the second electronic device can act as a communications hub that provides access to a WLAN and/or to a WWAN and, thus, to a wide variety of services that can be supported by various applications executing on the second electronic device. Thus, the second electronic device may include an 'access point' that communicates wirelessly with other electronic devices, and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via, e.g., different RATs. In these scenarios, a multi-mode electronic device or user equipment (UE) can be configured to prefer attachment to networks offering faster data rate throughput, as compared to other legacy networks offering lower data rate throughputs.

In accordance with various embodiments described herein, the terms 'wireless communication device,' 'wireless device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. In particular, electronic devices 110 (such as one or more smartphones, laptop computers, notebook computers, tablets, wearable computing devices, or other such electronic device(s)) may communicate wirelessly in a WPAN using a Bluetooth communication protocol. Thus, electronic devices 110 may have a connection or link with each other. When at least two electronic devices are communicating with each other using Bluetooth, they may form a network, e.g., a so-called 'piconet.' Note that electronic device 110-1 may be a 'primary' electronic device (which is sometimes referred to as a 'master') in the piconet, and electronic devices 110-2 and/or 110-3 may be 'secondary' electronic devices (which are sometimes referred to as 'slaves'). However, during the communication, these roles can be reassigned. In some embodiments, a master is a cellular telephone and a slave is a wearable device.

For example, electronic devices 110 may wirelessly communicate while: detecting one another by scanning wireless channels, transmitting and receiving frames on wireless channels, establishing connections (for example, by transmitting an inquiry, establishing a connection link, etc.), and/or transmitting and receiving packets or frames (which may include additional information, such as data, as payloads). In addition, electronic device 110-1 may communicate with access point 112, which may provide access to a network, such as the Internet, via a protocol such as Ethernet. Note that access point 112 may be a physical access point or a virtual access point that is implemented on a computer.

Figure 12:
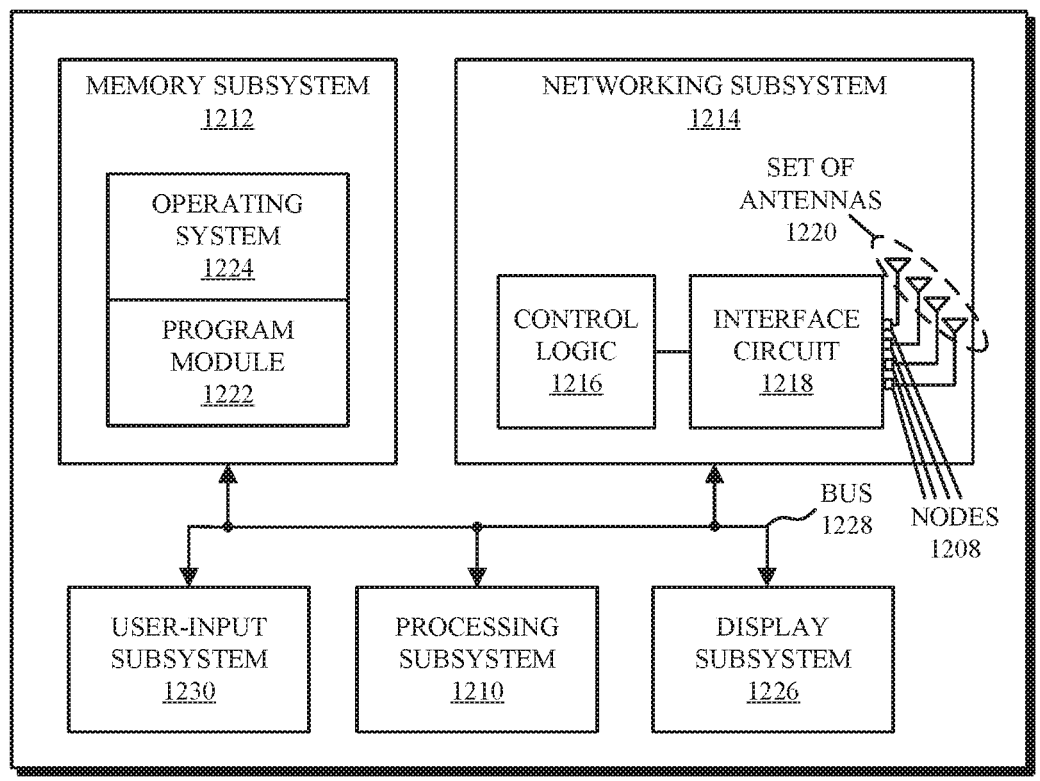
FIG. 12 is a block diagram illustrating an example electronic device, such as one of the electronic devices of FIG. 1.

As described further below with reference to FIG. 12, electronic devices 110 and access point 112 may include subsystems, including any or all of a networking subsystem, a memory subsystem, and a processor subsystem. In addition, electronic devices 110 and access point 112 may include radios 114, e.g., in the networking subsystems. More generally, electronic devices 110 and access point 112 can include (or can be included within) any electronic devices with networking subsystems that enable electronic devices 110 and access point 112 to wirelessly communicate with one or more other electronic devices. This can include transmitting frames on wireless channels to enable electronic devices to make initial contact with or to detect each other, followed by exchanging subsequent data/management frames (such as inquiries) to establish a connection, configuring security options, transmitting and receiving packets or frames via the connection, etc.

As can be seen in FIG. 1, wireless signals 116 are communicated by radios 114 in electronic devices 110. For example, as noted previously, electronic devices 110 may exchange packets using a Bluetooth communication protocol in a WPAN. Typically, Bluetooth communication involves spread spectrum communication with frequency hopping. In particular, many electronic devices communicate using Bluetooth in a 2.4 GHz frequency band that includes 79 channels. However, because of the proliferation of Bluetooth and coexistence with Wi-Fi communication in the 2.4 GHz frequency band, there can be problems with congestion and interference, which can degrade the communication performance and the user experience.

The disclosed communication technique addresses these challenges by extending the communication to two or more frequency bands (which are sometimes referred to as 'spectral bands'). For example, the communication may occur in a 2.4 GHz frequency band and in a 5 GHz frequency band. However, these frequency bands are only illustrations, and other frequency bands may be used.

In order to facilitate adaptive frequency hopping across the different spectral bands, a master (such as electronic device 110-1) may determine an adaptive spectral map which specifies channels across different spectral bands. For example, electronic device 110-1 may determine the adaptive spectral map based on any/all of: a link state, spectral utilization information and host information about electronic device 110-1, and/or a wireless environment that includes electronic devices 110. Note that electronic device 110-1 may determine the adaptive spectral map in conjunction with electronic devices 110-2 and/or 110-3. In particular, electronic devices 110-2 and/or 110-3 may provide information specifying recommended channels, and electronic device 110-1 may determine the adaptive spectral map based on the recommended channels. In some embodiments, electronic device 110-1: provides a link margin probe request to an electronic device (such as electronic device 110-2) to assess a suitability of a spectral band for inclusion in the spectral bands and receives, from electronic device 110-2, a link margin probe response with feedback about the suitability of the spectral band.

Subsequently, during communication between electronic devices 110 using Bluetooth, electronic devices 110 may select channels in the adaptive spectral map based on a predefined (and deterministic) frequency-hopping sequence. In order to synchronize the frequency hopping to the selected channels, electronic device 110 may provide the determined adaptive spectral map to electronic devices 110-2 and/or 110-3, along with information that specifies a start time when the adaptive spectral map is to be used.

In some embodiments, two or more electronic devices 110 may revert to communicating with each other in one of the spectral bands (such as the 2.4 GHz frequency band) using Bluetooth, e.g., upon the detection or occurrence of a condition. For example, the condition may include: a determination that an electronic device (such as electronic device 110-2) does not support frequency hopping across the spectral bands; a determination that a communication-performance metric associated with the communication compares with a threshold value in a predetermined manner (such as when the throughput is less than a predefined value and, more generally, when the communication performance is degraded); dynamic frequency selection information (such as when weather radar or military radar transmissions are detected in the 5 GHz band); when a connection with an electronic device (such as electronic device 110-2) has not yet been established; and/or when the connection with an electronic device (such as electronic device 110-2) is lost. Consequently, at least one of the channels in the adaptive spectral map may be in a spectral band that is used by legacy electronic devices that do not support frequency hopping across the spectral bands, such as in the 2.4 GHz frequency band. This approach may also provide backwards compatibility with the legacy electronic devices.

As described further below, the communication technique may be able to leverage the advantages of communication in the different spectral bands (including a spectral band at higher frequencies) without significant increases in free-space losses and/or directional behavior of antennas in electronic devices 110. This is because the antennas in electronic devices 110 may be non-optimal as a result of their small size, which in turn may be a consequence of the portability of electronic devices 110. Stated differently, because the antennas are already small, any penalties associated with communication at higher frequencies in a second spectral band (such as the 5 GHz frequency band) may be reduced. Consequently, the antennas in electronic devices 110 may be approximately equal to or less than one quarter of wavelengths in the spectral bands used for communication, which is a result of the volume in electronic devices 110 that is available for the antennas (i.e., the small size of electronic devices 110).

In these ways, the communication technique may allow electronic devices 110 to communicate data using Bluetooth with improved communication performance, thereby improving the user experience when using devices, such as electronic devices 110 and/or access point 112.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data included in a payload of the packet or frame).

In general, communication via the WPAN, when using the communication technique, may be characterized by a variety of communication-performance metrics. For example, the communication-performance metric may include: a received signal strength (RSS), a data rate, a data rate for successful communication (which may also be referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as 1-10 s) to an estimated maximum number of bytes that can be communicated in the time interval (the latter of which is sometimes referred to as a 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Moreover, while the communication technique was illustrated using electronic devices 110 in the previous discussion, in other embodiments the communication technique may be used with other electronic devices, such as a device in a peer-to-peer network.

Figure 2:
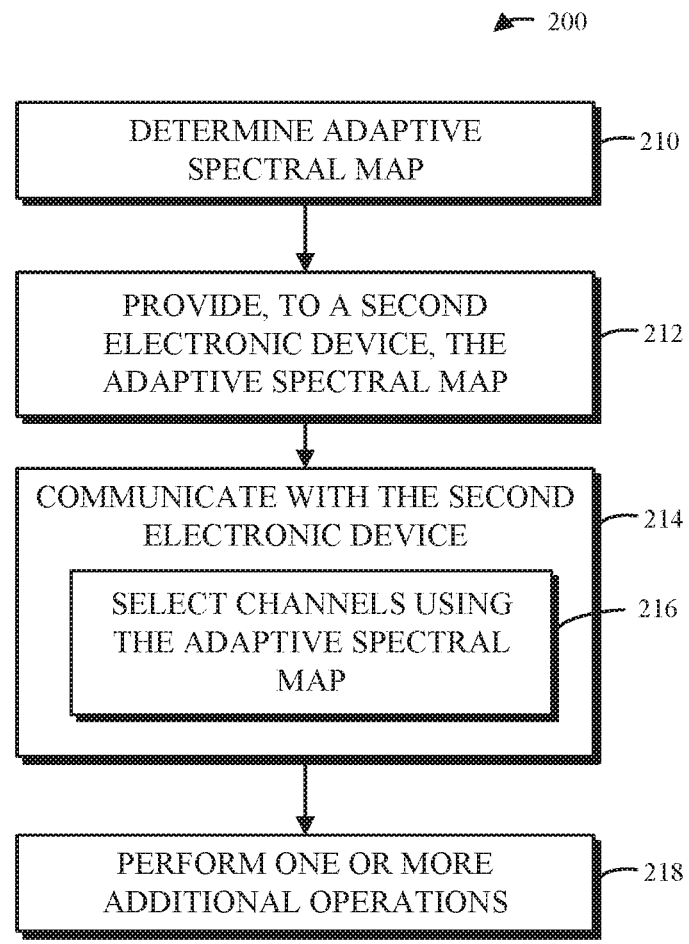
FIG. 2 is a flow diagram illustrating an example of a method for communicating with a second electronic device using one of the electronic devices in FIG. 1.

FIG. 2 presents a flow diagram illustrating an example method 200 for communicating with a second electronic device in accordance with some embodiments. This method may be performed by an electronic device, such as an interface circuit in electronic device 110-1 in FIG. 1. During operation, the electronic device may determine an adaptive spectral map (operation 210) that specifies channels across different spectral bands. For example, the electronic device may determine the adaptive spectral map based on any/all of: a link state, spectral utilization information and host information about an integrated circuit in the electronic device or the electronic device, and/or a wireless environment that includes the electronic device and the second electronic device.

Moreover, the electronic device may provide, to the second electronic device, the adaptive spectral map (operation 212) along with information that specifies a start time when the adaptive spectral map is used during communication between the electronic device and the second electronic device.

Subsequently, during communication (operation 214) with the second electronic device using a communication protocol (such as Bluetooth), the electronic device selects channels (operation 216) in the adaptive spectral map. In some implementations, the selection of channels can be based on a predefined frequency-hopping sequence. Note that the spectral bands may include a first spectral band and a second spectral band, and an integrated circuit in the electronic device may include a first communication circuit that communicates with a second integrated circuit in the second electronic device in the first spectral band and a second communication circuit that communicates with the second integrated circuit in the second spectral band. Thus, there may be dedicated communication circuits for communicating in the different spectral bands. Moreover, to facilitate backwards compatibility, at least one of the channels may be in a spectral band that is used by legacy electronic devices that do not support frequency hopping across the spectral bands.

In some embodiments, the electronic device optionally performs one or more additional operations (operation 218). For example, when a condition is detected or occurs, the electronic device may revert to communicating with the second electronic device in only one of the spectral bands (such as the 2.4 GHz frequency band) using the communication protocol. For example, the condition may include any/all of: determining that the second electronic device does not support frequency hopping across the spectral bands; determining that a communication-performance metric associated with the communication with the second electronic device satisfies a condition; determining that dynamic frequency selection information indicates a spectral band should not be used; determining that a connection with the second electronic device has not been established; and/or determining that the connection with the second electronic device has been lost. Note that the dynamic frequency selection information may be received from another device, such as the piconet master. Alternatively or additionally, if the electronic device can access the Internet (and, more generally, a network), the electronic device can share the dynamic frequency selection information, e.g., by pushing the dynamic frequency selection information. This may allow the complexity of the electronic device and/or the second electronic device to be reduced, e.g., in that it need not directly detect dynamic frequency selection information.

Furthermore, the electronic device may receive, from the second electronic device, information specifying recommended channels. Then, the electronic device determines the adaptive spectral map based on the recommended channels. In some embodiments, the electronic device instructs the second electronic device to assess one or more channels and/or spectral bands. For example, the electronic device may: provide a link margin probe request to the second electronic device to assess a suitability of a spectral band for inclusion in the spectral bands; and receive, from the second electronic device, a link margin probe response with feedback about the suitability of the spectral band.

In some embodiments of method 200 there may be additional or fewer operations. Moreover, the order of the operations may be changed, and/or two or more operations may be combined into a single operation.

In some embodiments, at least some of the operations in method 200 are performed by interface circuits in the electronic device or the second electronic device. For example, at least some of the operations may be performed by firmware executed by an interface circuit, such as by firmware associated with a MAC layer, as well as one or more circuits in a physical layer in the interface circuit.

Figure 3:
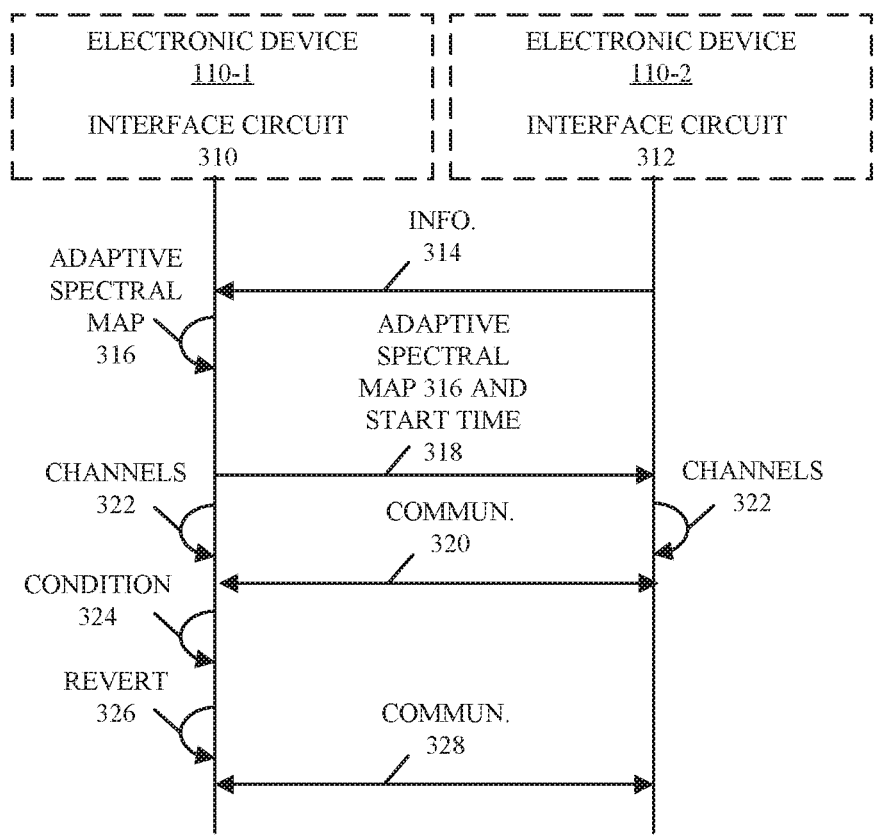
FIG. 3 is a flow diagram illustrating an example of communication between electronic devices, such as at least some of the electronic devices of FIG. 1.

FIG. 3 illustrates a flow diagram of an example of communication between electronic devices 110 in accordance with some embodiments. In particular, interface circuit 210 in electronic device 110-1 may communicate with interface circuit 312 in electronic device 110-2 using Bluetooth. During this communication, interface circuit 310 may optionally receive information 314 specifying recommended channels. For example, interface circuit 310 may optionally: provide a link margin probe request to interface circuit 312 to assess a suitability of a spectral band for inclusion in the spectral bands; and receive, from interface circuit 312, a link margin probe response with feedback about the suitability of the spectral band.

Then, interface circuit 310 may determine an adaptive spectral map 316 that specifies channels across multiple spectral bands. This adaptive spectral map may be determined based on any/all of: a link state, spectral utilization information and host information about integrated circuit 310 or electronic device 110-1, a wireless environment that includes electronic devices 110; and/or the optional recommended channels specified by information 314.

Moreover, interface circuit 310 may provide, to interface circuit 312, adaptive spectral map 316 along with information that specifies a start time 318 when adaptive spectral map 316 is to be used during communication between electronic devices 110.

Subsequently, during communication 320, interface circuits 310 and 312 may select channels 322 in adaptive spectral map 316. For example, the selected channels may be determined based on a predefined frequency-hopping sequence.

When a condition 324 is detected or occurs (such as based on the communication performance), interface circuit 310 may revert 326 to communicating 328 with interface circuit 312 in one of the spectral bands (as opposed to using multiple spectral bands). Note that adaptive spectral map 316 may include at least one channel in a legacy spectral band, which is used by legacy electronic devices that do not support frequency hopping across multiple spectral bands. In this way, electronic devices 110 may be able to recover (or maintain) their connection and continue communicating with each other. For example, interface circuit 310 may communicate, via the channel, with interface circuit 312 that subsequent communication is to occur only via channels in the legacy spectral band.

Representative Embodiments

We now describe embodiments of the communication technique. In the communication technique, a multiband Bluetooth framework is used to allow Bluetooth to operate in additional frequency bands. While a wide variety of additional frequency bands may be used, in the discussion that follows a frequency band between approximately 5-6 GHz is used as an illustrative example. This additional frequency band may be used to provide 'spectral backup' during communication in crowded environments (such as cities, mass transit, etc.) and/or to facilitate improved coexistence with other communication protocols (such as Wi-Fi). Note that in contrast with the 2.4 GHz frequency band, the 5 GHz frequency band is very diverse, and includes regulatory requirements, such as dynamic frequency selection (DFS).

Because of the small form factors of portable electronic devices (such as cellular telephones), the propagation in the 5 GHz frequency band may not, per se, be significantly reduced in comparison to the 2.4 GHz frequency band. In particular, the antenna aperture (e.g., the absolute antenna size) may dictate the free-space path loss. Furthermore, antenna matching may be easier (may be less lossy) at higher frequencies because the impedance transformation is smaller. In addition, while attenuation by walls, windows, doors, etc. is often increased by several dB in the 5 GHz frequency band, this can provide advantages in dense deployments.

The multiband Bluetooth protocol may include any/all of: spectral assignment (e.g., how to assign carrier frequencies for each packet), spectral coordination (such as link layer exchanges to setup/update/switch multiband Bluetooth configurations), and/or spectral assessment (such as mechanisms or techniques to help evaluate spectral bands).

In conventional Bluetooth communication, spectral hopping occurs over 79 channels (or a subset of the 79 channels when adaptive frequency hopping is used, which allows channels to be blacklisted based on the environmental conditions). In particular, during a 625 μs slot, a master may transmit using a predefined channel in a frequency-hopping sequence, and a slave may receive using the predefined channel. Then, in the next slot, the slave may transmit using the next predefined channel in the frequency-hopping sequence, and the master may receive using the next predefined channel. Subsequent communication may involve the master and the slave communicating in one or more slots using one or more predefined channels in the frequency-hopping sequence.

In a conventional Bluetooth interface circuit, a radio-frequency (RF) channel index selection box may select an RF channel using a selection kernel and based on one or more inputs, such as: a clock, an upper address part/lower address part (UAP/LAP) of a destination device, a sequence selection, an adaptive frequency-hopping channel map (that specifies channels in a spectral band, such as the 2.4 GHz frequency band) and/or another input. The resulting RF channel index (0 to 78) corresponds to an RF carrier frequency (2402 to 2480 MHz), and is used by a radio/modem to communicate (transmit or receive) data.

Figure 4:
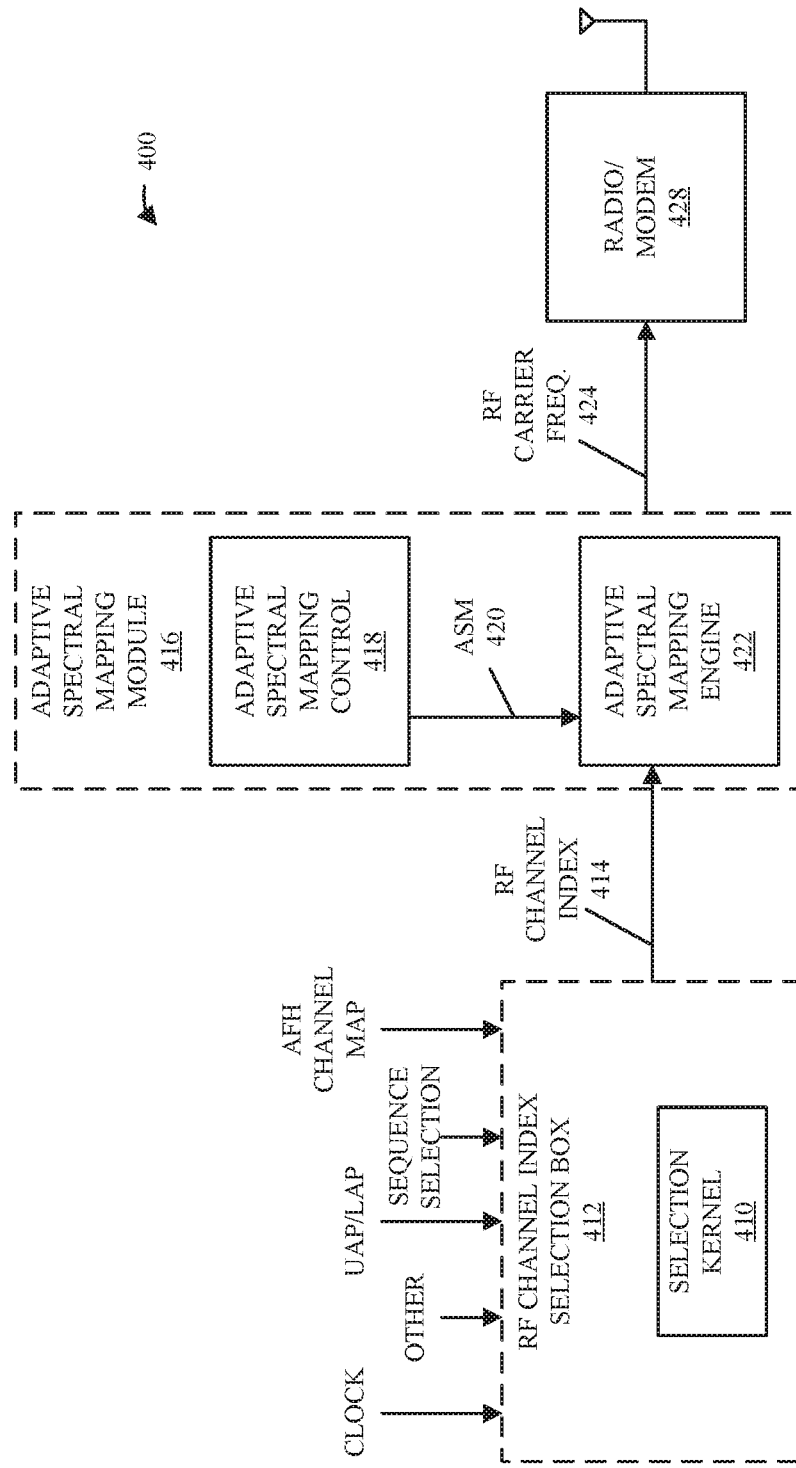
FIG. 4 is a block diagram illustrating an example of an integrated circuit in an electronic device, such as one of the electronic devices in FIG. 1.

In some embodiments, a modified integrated circuit facilitates the multiband Bluetooth communication in the communication technique. This is shown in FIG. 4, which presents a block diagram illustrating an example of an integrated circuit 400 in an electronic device (such as electronic device 110-1 in FIG. 1). In particular, adaptive spectral mapping module 416 maps the RF channel index 414 (0 to 78) output by RF channel index selection box 412 (based on one or more inputs) to RF carrier frequency 424 (e.g., in MegaHertz). Then, radio/modem 428 communicates data using RF carrier frequency 424. Note that adaptive spectral mapping module 416 may include an adaptive spectral mapping control 418 that determines an adaptive spectral map (ASM) 420, which is used by adaptive spectral mapping engine (or circuit) 422.

In FIG. 4, the RF channel index 414 is mapped to a physical carrier frequency (e.g., RF carrier frequency 424 using a context-dependent adaptive spectral map 420. Moreover, selection kernel 410 may remain unchanged. Consequently, the communication technique may be implemented in a manner that is minimally invasive and may allow concurrent serving of legacy and multiband Bluetooth devices in the same piconet with a single piconet-specific hopping core.

Figure 5:
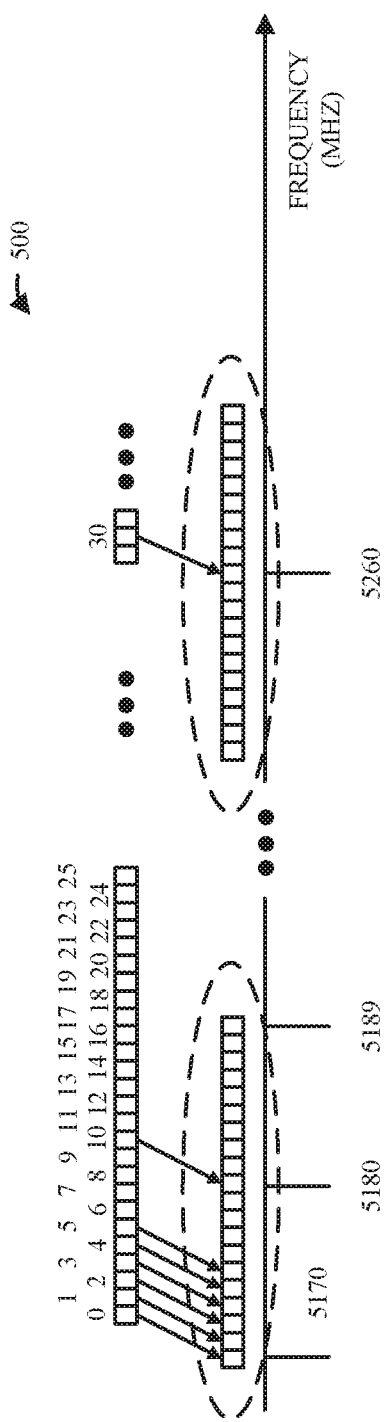
FIG. 5 is a drawing illustrating an example of an adaptive spectral map.

FIG. 5 presents a drawing illustrating an example of an adaptive spectral map 500. As shown in Table 1, in this example, four channel groups are defined. Each group is approximately 20 MHz wide. Consequently, in adaptive spectral map 500, each group is assigned to approximately a 20 MHz portion of spectrum using international channel identifiers.

Figure 7:
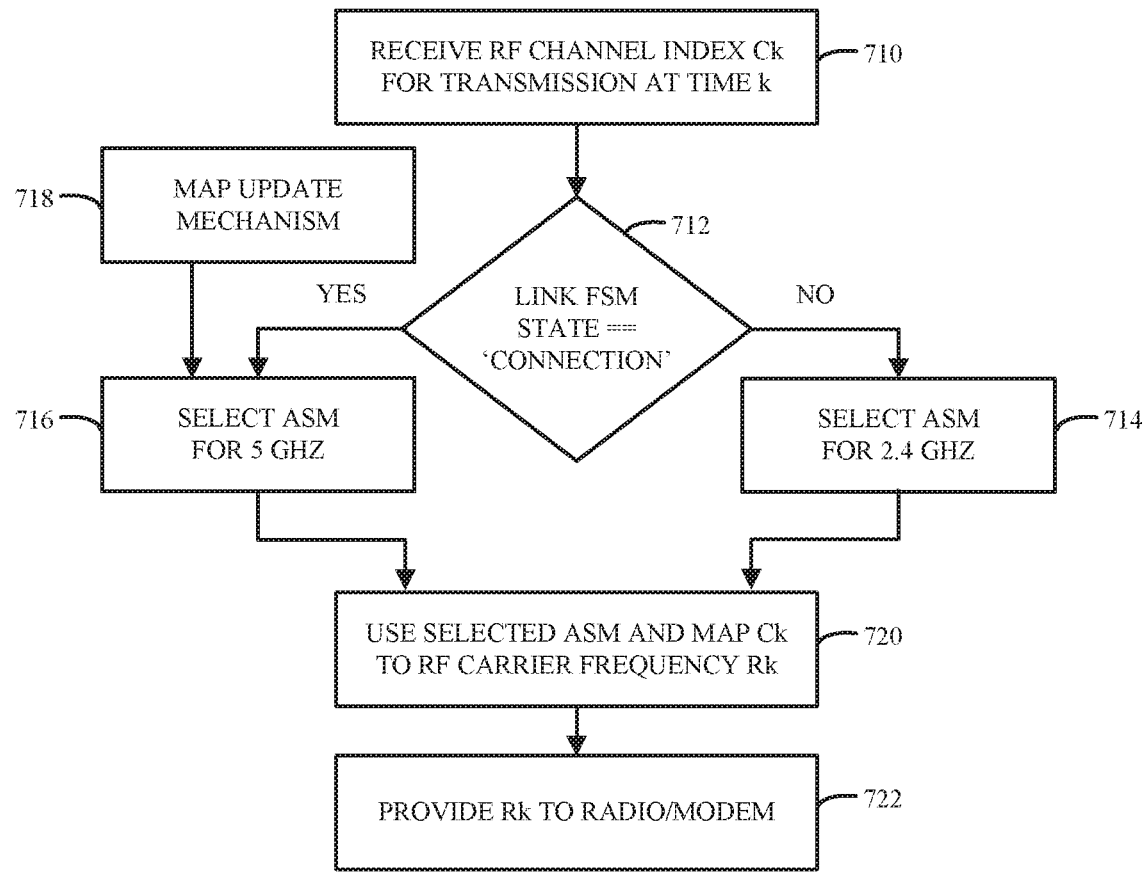
FIG. 7 is a flow diagram illustrating an example of a method for performing adaptive spectral mapping across different spectral bands using one of the electronic devices in FIG. 1.

Note that the desired mapping may be context-dependent and, therefore, may change over time (such as based on recommendations or feedback received in response to link management protocol packets). In FIG. 5, adaptive spectral map 500 includes channels in the 2.4 GHz band of frequencies and in the 5 GHz band of frequencies.

such as electronic device 110-1 in FIG. 1. As shown in FIG. 7, after receiving a radio-frequency channel index Ck for transmission at time k (operation 710), the adaptive spectral map may revert to a legacy configuration (operation 714) (such as utilizing only channels in the 2.4 GHz frequency band) when a connection with another electronic device has not been established yet (operation 712). For example, in a default multiband Bluetooth configuration, a conventional 2.4 GHz spectral map may be used for discovery-related (connectionless) processes, while an adaptive spectral map including multiple frequency bands may optionally be used for connected data traffic. Alternatively, the adaptive spectral map may use, e.g., the 5 GHz frequency band (operation 716) when a connection with another electronic device has already been established (operation 712). This approach may allow a mixed or a combination of, e.g., 2.4 GHz/5 GHz channels in the adaptive spectral map. This may occur during inquiry/paging.

Then, the selected adaptive spectral map may be used to map Ck to a radio-frequency carrier frequency rk (operation 720), and rk may be provide to the radio/modem (operation 722).

TABLE 1

| RF CHANNEL INDEX 414 | GROUP CENTER (MHz) | INTERNATIONAL CHANNEL ID |
|---|---|---|
| 0, 1, 2, 3, 4, 5 . . . 19 | 5180 | 36 |
| 20, 21, 22 . . . 39 | 5260 | 52 |
| 40, 41, 42 . . . 59 | 2442 | 6 |
| 60, 61, 62 . . . 78 | 4925 | 185 |
| RF CARRIER FREQUENCY 424 = GROUP CENTER − 10 + MOD(RF CHANNEL INDEX 414, 20) | | |

In some embodiments, a modified integrated circuit facilitates the multiband Bluetooth communication in the communication technique. This is shown in FIG. 4, which presents a block diagram illustrating an example of an integrated circuit 400 in an electronic device (such as electronic device 110-1 in FIG. 1). In particular, adaptive spectral mapping module 416 maps the RF channel index 414 (0 to 78) output by RF channel index selection box 412 (based on one or more inputs) to RF carrier frequency 424 (e.g., in MegaHertz). Then, radio/modem 428 communicates data using RF carrier frequency 424. Note that adaptive spectral mapping module 416 may include an adaptive spectral mapping control 418 that determines an adaptive spectral map (ASM) 420, which is used by adaptive spectral mapping engine (or circuit) 422.

For example, link information 612 may include any/all of: a link finite state machine (FSM) state, an adaptive frequency-hopping selection, a multiband-capable Bluetooth destination vs. a legacy destination, and/or a link margin (such as a communication-performance metric). Moreover, host information 616 may include any/all of: an application, a location (such as country), WLAN activity (such as temporal and spectral negotiation between a Bluetooth chip and a WLAN chip 622), DFS information (which may be provided by another device in a WLAN or WPAN), and/or a device type. Furthermore, spectral utilization information 618 may include any/all of: an RSSI scan, radar detect/DFS information, and/or other interference scans.

FIG. 7 presents a flow diagram illustrating an example of a method 700 for performing adaptive spectral mapping across different spectral bands using an electronic device, In some embodiments, when the adaptive spectral map is updated (operation 718), the new or updated adaptive spectral map may specify, e.g., use of the 5 GHz frequency band (operation 716).

Note that in some embodiments a multiband Bluetooth master may have two maps for a given piconet: a conventional spectral map and an adaptive spectral map. For each of these maps, there may be a separate adaptive-frequency-hopping (AFH) channel map. In this way, both legacy and multiband Bluetooth devices can operate in the same piconet.

Figure 8:
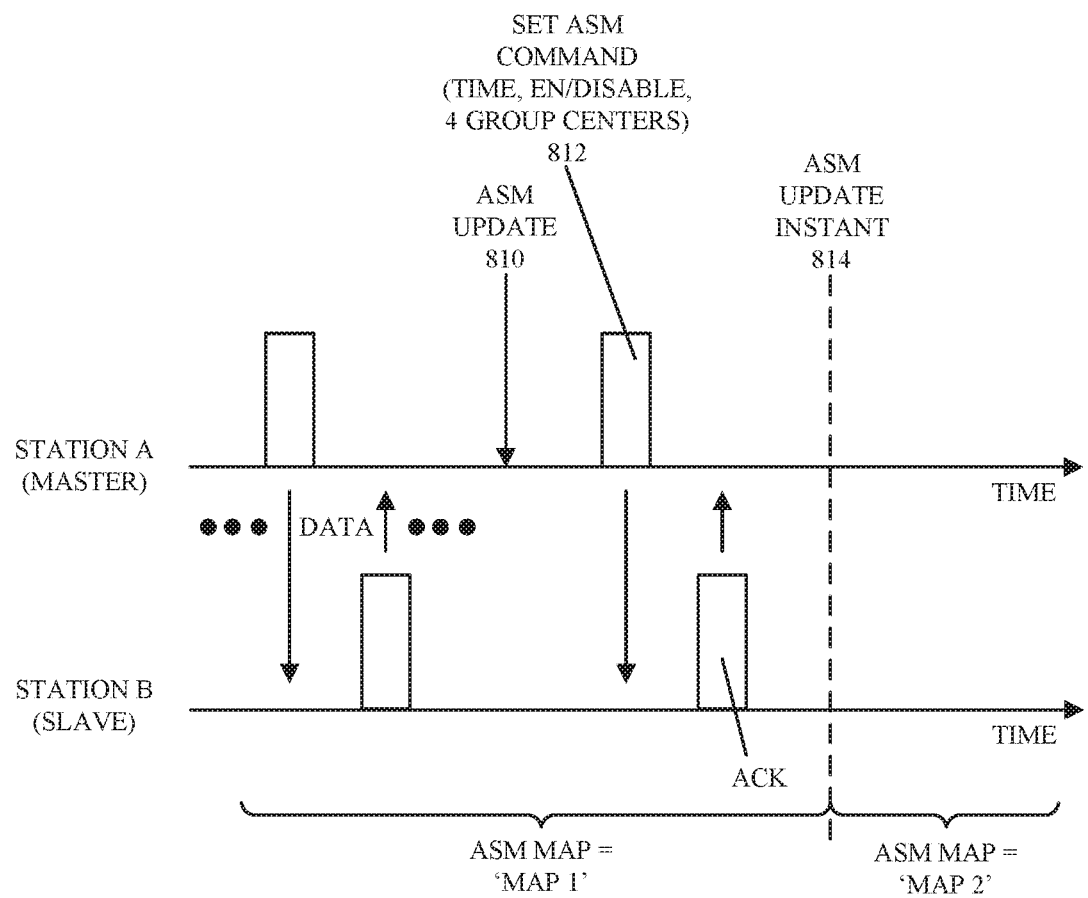
FIG. 8 is a timing diagram illustrating an example of link-margin-probe communication between electronic devices, such as at least some of the electronic devices of FIG. 1.

As noted previously, in some embodiments link margin probe packets are used to enable or disable an update to the adaptive spectral map. This is shown in FIG. 8, which presents a timing diagram illustrating an example of link-margin-probe communication between electronic devices, such as electronic devices 110 (FIG. 1). In addition, Table 2 provides an example of an update to an adaptive spectral map. In other implementations, the update can include different, more, or fewer fields, and the respective sizes of any/all fields can vary.

TABLE 2

| Operating Code (1B) | Enable/ Disable (1B) | Time for ASM instant update (4B) | 4 group centers (channel identifiers) (4B) |
|---|---|---|---|

The approach shown in FIG. 8 may be similar to that used when updating an adaptive-frequency-hopping channel map. In particular, the link margin probe packets are used to define a future time instant at which the switch happens, such as whether to enable/disable the adaptive spectral map, to provide a group center for each one of the four groups of approximately 20 channels, etc.

Thus, stations A and B may initial exchange data using adaptive spectral map 1. After receiving adaptive-spectral-map update 810, station A may transmit the updated adaptive spectral map to station B using a set adaptive-spectral-map command 812, which may include the future time instant, the enable/disable information, the group centers for four groups, etc. Then, at the future time instant (i.e., adaptive-spectral-map update instant 814), stations A and B may start using adaptive spectral map 2.

In some embodiments, when the handshake fails to happen in time before the update time, the communication technique uses a recovery technique that is similar to that used during adaptive frequency hopping.

As noted previously, each adaptive-spectral-map configuration for a given piconet (such as one classic or conventional spectral map and one 2.4 GHz/5 GHz adaptive spectral map) may have its own adaptive-frequency-hopping channel map. When an adaptive-spectral-map update occurs, the portions of the adaptive-frequency-hopping channel maps that were reallocated may be reset to 'all available.'

Figure 9:
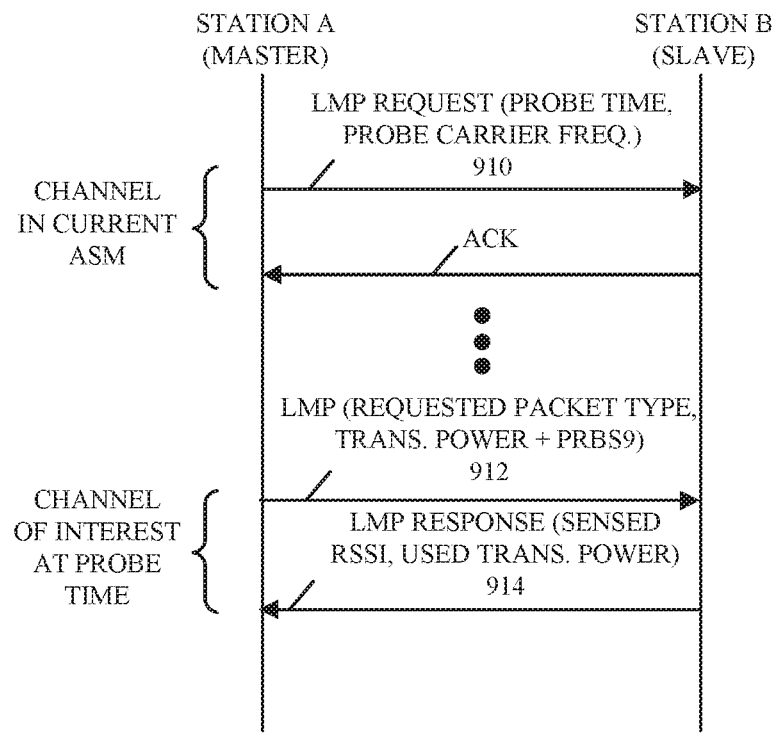
FIG. 9 is a flow diagram illustrating an example of communication associated with a link margin probe request and response between electronic devices, such as at least some of the electronic devices of FIG. 1.

In general, switching the spectrum used for a link can have a profound impact on the link. For example, the link between two electronic devices can provide acceptable performance at 2.4 GHz, but may provide unacceptable performance at 5 GHz, e.g., because of propagation conditions, transmit power constraints, etc. Consequently, in some embodiments, the communication technique includes a 'link margin probe' mechanism. This is shown in FIG. 9, which presents a flow diagram illustrating an example of communication associated with a link margin probe (LMP) request and response between electronic devices (such as electronic devices 110 in FIG. 1). In addition, Table 3 provides examples of a link margin probe request, a link margin probe, and a link margin probe response. The fields and sizes shown are exemplary only and more, fewer, or different fields and/or different sizes can be used in other implementations.

TABLE 3

| Link Margin Probe Request | Operating Code (1B) | Probe Time (4B) | Probe Carrier Frequency (2B) | Pseudorandom Bit Sequence (PRBS) 9 (to fill slot) |
|---|---|---|---|---|
| Link Margin Probe | Operating Code (1B) | Requested Packet Type (1B) | Requested Transmit Power (1B) | Pseudorandom Bit Sequence (PRBS) 9 (to fill slot) |
| Link Margin Probe e Respons | Operating Code (1B) | Sensed RSSI (1B) | Used Transmit Power (1B) | Pseudorandom Bit Sequence (PRBS) 9 (to fill slot) |

In particular, two electronic devices (e.g., two peers) may make a single scheduled two-way packet exchange in a target channel to assess the link margin in that channel. For example, the master (e.g., electronic device 110-1) may request 910 probe exchange at some carrier frequency (e.g., 5139 MHz) at a prescheduled time. At the desired time, the master may send a probe 912 requesting that the slave (e.g., electronic device 110-2) transmit a specific packet type (link margin probe response 914) at a requested transmit power. The slave may respond with the sensed RSSI and the transmit power it actually used. Note that multiple probes can be used by the master to build a rough 'landscape' of expected link margin (path loss) conditions in a target spectrum before sending a set adaptive spectral map' update.

Figure 10:
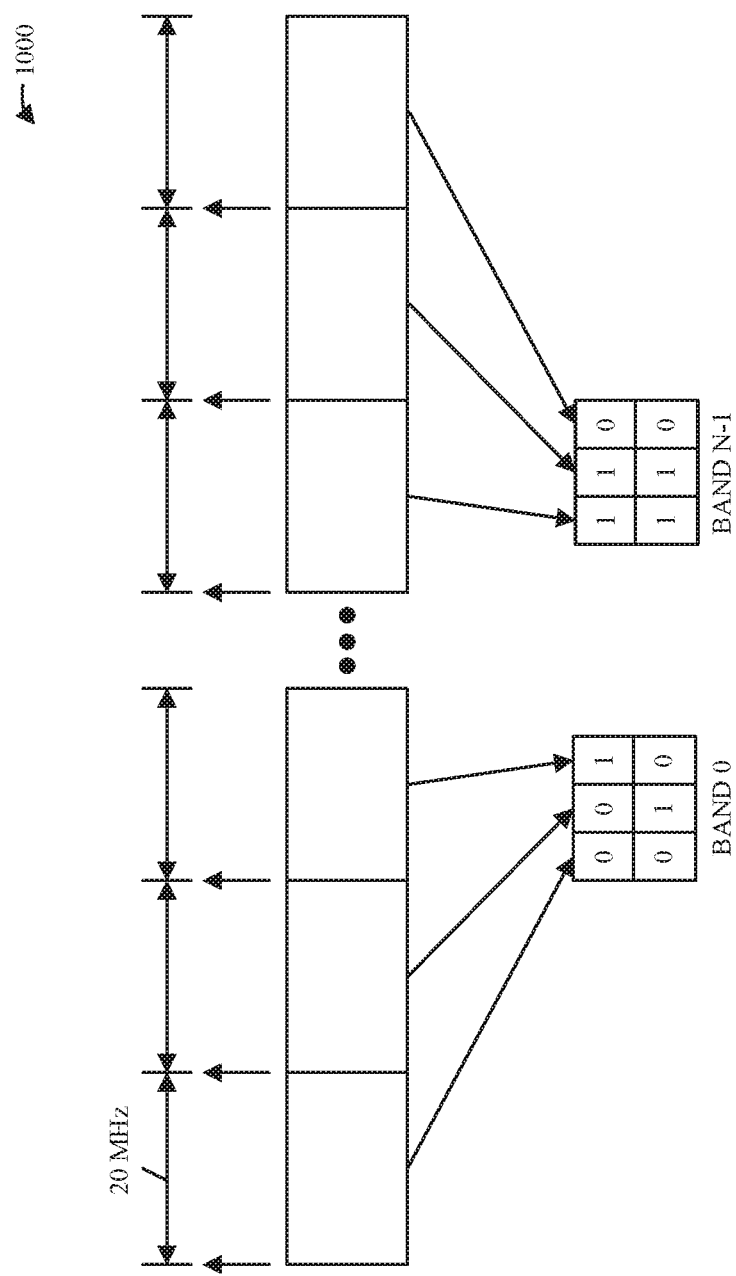
FIG. 10 is drawing illustrating an example of a spectrum classification report.

The piconet master may query slaves to: assess channel quality as measured by the slave station and/or learn of or about slave constraints on supported frequencies because of RF limitations, coexistence considerations, etc. For example, the master may send a request or message for an adaptive spectral map spectrum report to the slave. This message may include: a staring frequency (MHz) and/or a number of 20 MHz bands to measure. In response, the slave may return a two-bit classification for each 20 MHz group in the requested 20 MHz bands. As shown in Table 4, which provides an example the information in a spectrum classification report, for each 20 MHz channel there are four possible responses. For example, '00' may indicate that the slave declares a group as 'unsupported' (and the master may not honor this); '01' may indicate that the slave declares a group as 'supported but not recommended' (e.g., high interference); '10' may indicate that the slave declares a group as 'supported' (with no recommendation attached); and '11' may indicate that the slave declares a group as 'supported and recommended' (e.g., clear spectrum). FIG. 10 presents drawing illustrating an example of a spectrum classification report 1000.

TABLE 4

| | |
|---|---|
| 00 | Slave declares a group as 'unsupported' |
| 01 | Slave declares a group as 'supported' but not recommended |
| 10 | Slave declares a group as 'supported' |
| 11 | Slave declares a group as 'supported and recommended' |

We now describe remapping of unsupported bands. In a piconet, a single station A (master) may communicate with multiple stations B (slaves). In a multiband Bluetooth implementation, it is possible that for reasons related to RF capabilities, coexistence, or legacy, one or more of the stations B may be unable to support an otherwise attractive 20 MHz band. In this case, the master can choose not to remap channels into the band unsupported by the one or more the stations B, or may choose not to use adaptive spectral mapping with these stations B. In some embodiments, a common adaptive-frequency-hopping channel map is used for traditional 2.4 GHz Bluetooth and another adaptive-frequency-hopping channel map is used in conjunction with the adaptive spectral mapping, e.g., multi-band. For example, station A may use adaptive spectral mapping to assign channels in, e.g., four 20 MHz sub-bands in the 5 GHz spectrum or spectral band. In response to messaging from a station B, station A may remap the frequency associated with an unsupported sub-band to another frequency. As a result of the remapping, station A can preserve the use of up to, e.g., four 20 MHz sub-bands in the 5 GHz spectrum.

This approach may provide several advantages. Notably, it may reduce the messaging overhead associated with having per-user adaptive spectral maps and adaptive-frequency-hopping channel maps. It may also make better use of the 5 GHz spectrum. Note that if only one slave device lacks support for a particular 5 GHz sub-band, the remaining slaves in the piconet may make use of the spectrum. Consequently, this approach may avoid having to choose between scheduling a user exclusively in the 2.4 GHz frequency band, which may be congested, and giving up uncongested spectrum for the remaining users.

In some embodiments, the decisions are made in sub-bands of frequencies. Moreover, the sub-bands of frequencies may correspond to a frequency interval, such as, but not limited to, 20 MHz. Furthermore, the piconet master may, on a sub-band-by-sub-band and a user-by-user basis, remap an unsupported user to a supported frequency band. Additionally, the piconet master may remap sub-bands on a user-by-user basis based on link quality.

We now further describe the link margin probe. In some embodiments, a link margin probe request is made by the master. In particular, the master may transmit a configuration message to a slave, instructing the slave to measure and determine a received signal strength indicator (RSSI) for a server transmission on an indicated frequency and to respond with a response at the same frequency. This response may include any/all of the measured RSSI information, the acknowledgement (ACK) or negative acknowledgment (NACK) of the packet, and agreed-upon data. The agreed-upon data may assist the master in assessing the link quality from the slave. Moreover, the link margin probe request may also include a target output power for the slave's response. The slave's response may include its actual transmit output power used in transmitting the response. This approach may address the case in which the slave is unable to transmit the requested output power or do so exactly.

As noted previously, the propagation loss usually increases as the frequency increases because of the free-space loss equation (which provides a lower bound on the propagation loss). Moreover, as the frequency increases, antennas tend to become more directional and, therefore, cannot collect as much RF energy as an omnidirectional antenna. Typically, therefore, the antenna size is reduced at high frequencies. While this design choice can make the antenna more omnidirectional, the smaller antenna may collect less energy. Consequently, communication performance may decrease as the frequency increases.

However, in a portable electronic device, the antenna may already be small because of the space or volume constraints associated with a small form factor. Because the antenna is already small (e.g., it may be smaller than a quarter wavelength on a side), it may be sub-optimal in size (in the sense that the free-space propagation loss may not be minimized for a particular frequency or wavelength). Consequently, the propagation-loss penalty associated with the use of a higher-frequency band, such as the 5 GHz frequency band, may be reduced, which may make the communication technique more attractive.

Figure 11:
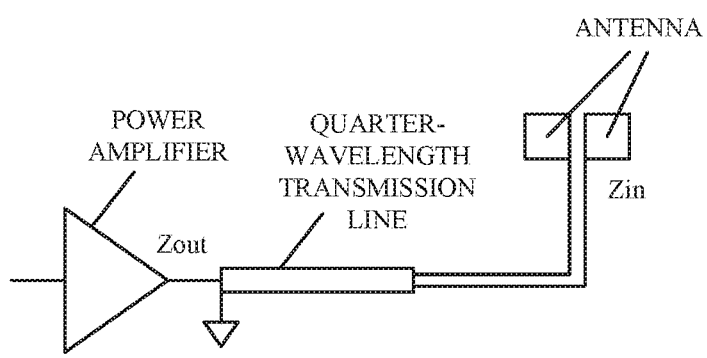
FIG. 11 is a block diagram illustrating an example of a matching network.

In addition, the impedance of a small antenna at high frequencies may better match the impedance of the transmit/receive antennas. This is illustrated in FIG. 11, which presents a block diagram illustrating an example of a matching network 1100. In particular, a half-wavelength dipole antenna may have an impedance (Zin) of about 75 Ω. As the size of this antenna is reduced, the antenna impedance may also be reduced. For example, a short dipole antenna may have an impedance that is much less than 50 Ω. Typically, this is addressed using a matching network. In general, the larger the ratio of the output impedance (Zout) of the power amplifier to the input impedance of the antenna, the greater the resulting loss. However, a small antenna may work better at higher frequencies because the antenna impedance may increase. Thus, it may be easier to build low-loss electrical circuits (such as a matching network) for use with the small antennas in a portable electronic device when operated at higher frequencies (such as the 5 GHz band of frequencies).

We now describe embodiments of an electronic device. FIG. 12 presents a block diagram of an electronic device 1200 (which may be an electronic device or an access point) in accordance with some embodiments. This electronic device includes processing subsystem 1210 (which is sometimes referred to as 'processing logic' or a 'means for processing'), memory subsystem 1212, and networking subsystem 1214. Processing subsystem 1210 includes one or more devices configured to perform computational operations. For example, processing subsystem 1210 can include one or more microprocessors, application-specific integrated circuits (ASICs), microcontrollers, programmable-logic devices, and/or one or more digital signal processors (DSPs).

Memory subsystem 1212 includes one or more devices for storing data and/or instructions for processing subsystem 1210 and networking subsystem 1214. For example, memory subsystem 1212 can include dynamic random access memory (DRAM), static random access memory (SRAM), a read-only memory (ROM), flash memory, and/or other types of memory. In some embodiments, instructions for processing subsystem 1210 in memory subsystem 1212 include: one or more program modules or sets of instructions (such as program module 1222 or operating system 1224), which may be executed by processing subsystem 1210. For example, a ROM can store programs, utilities or processes to be executed in a non-volatile manner, and DRAM can provide volatile data storage, and may store instructions related to the operation of electronic device 1200. Note that the one or more computer programs may constitute a computer-program mechanism, a computer-readable storage medium or software. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210. In some embodiments, the one or more computer programs are distributed over a network-coupled computer system so that the one or more computer programs are stored and executed in a distributed manner.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Networking subsystem 1214 includes one or more devices configured to couple to and communicate on a wired and/or wireless network (i.e., to perform network operations), including: control logic 1216, an interface circuit 1218 (which is sometimes referred to as a 'communication circuit') and a set of antennas 1220 (or antenna elements). These antennas may be included inside of a cavity (defined by an inner surface of an external housing or case) or an internal volume of electronic device 1200. In some embodiments, set of antennas 1220 includes an adaptive array that can be selectively turned on and/or off by control logic 1216 to create a variety of optional antenna patterns or 'beam patterns.' (While FIG. 12 includes set of antennas 1220, in some embodiments electronic device 1200 includes one or more nodes, such as nodes 1208, e.g., a pad, which can be coupled to set of antennas 1220. Thus, electronic device 1200 may or may not include set of antennas 1220.) For example, networking subsystem 1214 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting advertising or beacon frames and/or scanning for advertising frames transmitted by other electronic devices.

Within electronic device 1200, processing subsystem 1210, memory subsystem 1212, and networking subsystem 1214 are coupled together using bus 1228 that facilitates data transfer between these components. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/ or electro-optical connections among the subsystems.

In some embodiments, electronic device 1200 includes a display subsystem 1226 for displaying information on a display, which may include a display driver and the display, such as a liquid-crystal display, a multi-touch touchscreen, etc. Display subsystem 1226 may be controlled by processing subsystem 1210 to display information to a user (e.g., information relating to incoming, outgoing, or an active communication session).

Electronic device 1200 can also include a user-input subsystem 1230 that allows a user of the electronic device 1200 to interact with electronic device 1200. For example, user-input subsystem 1230 can take a variety of forms, such as: a button, keypad, dial, touch screen, audio input interface, visual/image capture input interface, input in the form of sensor data, etc.

Electronic device 1200 can be (or can be included in) any electronic device with at least one network interface. For example, electronic device 1200 may include: a cellular telephone or a smartphone, a wireless device, a mobile device, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or display subsystems. Additionally, one or more of the subsystems may not be present in electronic device 1200. Moreover, in some embodiments, electronic device 1200 may include one or more additional subsystems that are not shown in FIG. 12. Also, although separate subsystems are shown in FIG. 12, in some embodiments some or all of a given subsystem or component can be integrated into one or more of the other subsystems or component(s) in electronic device 1200. For example, in some embodiments program module 1222 is included in operating system 1224 and/or control logic 1216 is included in interface circuit 1218.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1214. This integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/ or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Bluetooth communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1222, operating system 1224 (such as a driver for interface circuit 1218) or in firmware in interface circuit 1218. Alternatively or additionally, at least some of the operations in the communication technique may be implemented in a physical layer, such as hardware in interface circuit 1218. In an exemplary embodiment, the communication technique is implemented, at least in part, in a MAC layer and/or in a physical layer in interface circuit 1218. In some embodiments, firmware in interface circuit 1218 is used to program hardware for slot-by-slot assignments using hardware registers.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit in a client electronic device, comprising:
   one or more nodes configured to communicatively couple to an antenna; and
   processing logic, communicatively coupled to the one or more nodes, configured to determine an adaptive spectral map that specifies channels across two or more distinct, non-overlapping spectral bands comprising at least 2.4 GHz and 5.0 GHz respectively that are used by the client electronic device for transmissions to at least one of a second client electronic device or an access point,
   wherein:
   during communication with a second integrated circuit in the second client electronic device or the access point using a communication protocol, the channels specified by the adaptive spectral map are selected based on a predefined frequency-hopping sequence of radio frequency (RF) channel indices that span the two or more distinct, non-overlapping spectral bands,
   the spectral bands include a first spectral band and a second spectral band, and
   the integrated circuit includes a first communication circuit configured to communicate with the second integrated circuit using the first spectral band and a second communication circuit configured to communicate with the second integrated circuit using the second spectral band.

2. The integrated circuit of claim 1, wherein the integrated circuit is configured to revert to communicating with the second integrated circuit using a second predefined frequency-hopping sequence of RF channel indices that span only one of the spectral bands using the communication protocol when a condition is detected; and
   wherein the condition includes:
   when the second integrated circuit does not support frequency hopping across the spectral bands;
   a communication-performance metric associated with the communication with the second integrated circuit;
   dynamic frequency selection information;
   when a connection with the second integrated circuit has not been established; or
   when the connection with the second integrated circuit is terminated.

3. The integrated circuit of claim 1, wherein the communication protocol is compatible with Bluetooth.

4. The integrated circuit of claim 1, wherein the processing logic is configured to determine the adaptive spectral map based on one or more of: a link state, spectral utilization information, or host information about the integrated circuit and a wireless environment.

5. The integrated circuit of claim 1, wherein at least one of the channels is in a first spectral band that is used by legacy integrated circuits that do not support frequency hopping across the spectral bands.

6. The integrated circuit of claim 1, wherein the integrated circuit is configured to receive, from the second integrated circuit, information specifying recommended channels; and
   wherein the processing logic is further configured to determine the adaptive spectral map based on the recommended channels.

7. The integrated circuit of claim 1, wherein the integrated circuit is configured to provide, to the second integrated circuit, the adaptive spectral map along with information that specifies a start time when the adaptive spectral map is used during communication between the integrated circuit and the second integrated circuit.

8. The integrated circuit of claim 1, wherein the integrated circuit is configured to:
   provide a link margin probe request to the second integrated circuit to assess a suitability of a spectral band for inclusion in the spectral bands; and
   receive, from the second integrated circuit, a link margin probe response with feedback about the suitability of the spectral band.

9. A client electronic device, comprising:
an antenna included within the client electronic device; and
an integrated circuit, the integrated circuit comprising:
one or more nodes configured to communicatively couple to the antenna; and
processing logic, communicatively coupled to the one or more nodes, configured to determine an adaptive spectral map that specifies channels across two or more distinct, non-overlapping spectral bands comprising at least 2.4 GHz and 5.0 GHz respectively that are used by the client electronic device for transmissions to at least one of a second client electronic device or an access point;
wherein
during communication with a second integrated circuit in the second client electronic device or the access point using a communication protocol, the channels in the adaptive spectral map are selected based at least in part on a predefined frequency-hopping sequence of radio frequency (RF) channel indices that span the two or more distinct, non-overlapping spectral bands,
a volume in the electronic device available for the antenna is approximately equal to or less than one quarter of wavelengths in the spectral bands,
the spectral bands include a first spectral band and a second spectral band, and
the integrated circuit includes a first communication circuit configured to communicate with the second integrated circuit using the first spectral band and a second communication circuit configured to communicate with the second integrated circuit using the second spectral band.

10. The client electronic device of claim 9, wherein the integrated circuit is configured to revert to communicating with the second integrated circuit using a second predefined frequency-hopping sequence of RF channel indices that span only one of the spectral bands using the communication protocol when a condition occurs; and
wherein the condition includes:
when the second integrated circuit does not support frequency hopping across the spectral bands;
a communication-performance metric associated with the communication with the second integrated circuit;
dynamic frequency selection information;
when a connection with the second integrated circuit has not been established; or
when the connection with the second integrated circuit is terminated.

11. The client electronic device of claim 9, wherein the communication protocol comprises a Bluetooth communication protocol.

12. The client electronic device of claim 9, wherein the processing logic is configured to determine the adaptive spectral map based on one or more of: a link state, spectral utilization information, or host information about the integrated circuit and a wireless environment.

13. The client electronic device of claim 9, wherein at least one of the channels is in a first spectral band that is used by legacy integrated circuits that do not support frequency hopping across the spectral bands.

14. The client electronic device of claim 9, wherein the integrated circuit is configured to receive, from the second integrated circuit, information specifying recommended channels; and
wherein the processing logic is further configured to determine the adaptive spectral map based at least in part on the recommended channels.

15. The client electronic device of claim 9, wherein the integrated circuit is configured to:
provide, to the second integrated circuit, the adaptive spectral map along with information that specifies a start time when the adaptive spectral map is used during communication between the integrated circuit and the second integrated circuit.

16. The client electronic device of claim 9, wherein the integrated circuit is configured to:
provide a link margin probe request to the second electronic device to assess a suitability of a spectral band for inclusion in the spectral bands; and
receive, from the second electronic device, a link margin probe response with feedback about the suitability of the spectral band.

17. A method for communicating with a second electronic device, the method comprising:
frequency hopping, using an integrated circuit in a client electronic device, across two or more distinct, non-overlapping spectral bands comprising at least 2.4 GHz and 5 GHz respectively, based at least in part on an adaptive spectral map of radio frequency (RF) channel indices that specify RF channels across the two or more distinct, non-overlapping spectral bands;
communicating frames compatible with a communication protocol in the channels to the second electronic device comprising at least one of a second client electronic device or an access point; and
operating a first communication circuit in the client electronic device to communicate with the second electronic device using a first spectral band chosen from the two or more distinct, non-overlapping spectral bands, and operating a second communication circuit in the client electronic device to communicate with the second electronic device using a second spectral band chosen from the two or more distinct, non-overlapping spectral bands.

18. The method of claim 17, wherein the method further comprises determining the adaptive spectral map based at least in part on one or more of: a link state, spectral utilization information, or host information about the integrated circuit and a wireless environment that includes the client electronic device and the second electronic device.

* * * * *

UNITED STATES PATENT AND TRADEMARK OFFICE
CERTIFICATE OF CORRECTION

PATENT NO. : 10,749,568 B2  
APPLICATION NO. : 15/674397  
DATED : August 18, 2020  
INVENTOR(S) : Hammerschmidt et al.

Page 1 of 1

It is certified that error appears in the above-identified patent and that said Letters Patent is hereby corrected as shown below:

In the Specification

At Column 9, Lines 18-19: "interface circuit 210 in electronic device" should read -- interface circuit 310 in electronic device --.

Figure 6:
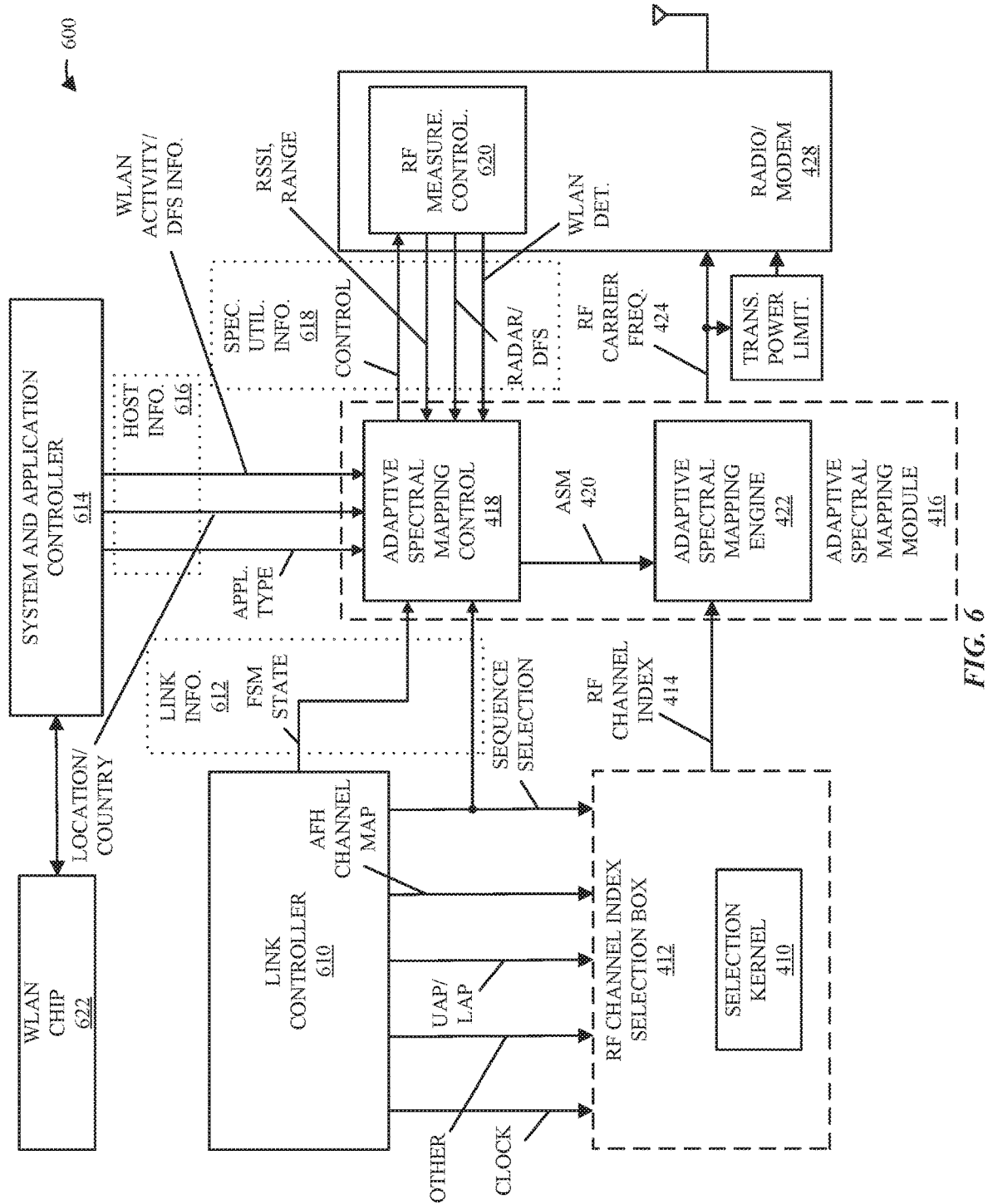
FIG. 6 is a block diagram illustrating an example of an integrated circuit in an electronic device, such as one of the electronic devices in FIG. 1.

At Column 11, Lines 36-51: "In some embodiments, a modified integrated circuit facilitates the multiband Bluetooth communication in the communication technique. This is shown in FIG. 4, which presents a block diagram illustrating an example of an integrated circuit 400 in an electronic device (such as electronic device 110-1 in FIG. 1). In particular, adaptive spectral mapping module 416 maps the RF channel index 414 (0 to 78) output by RF channel index selection box 412 (based on one or more inputs) to RF carrier frequency 424 (e.g., in MegaHertz). Then, radio/modem 428 communicates data using RF carrier frequency 424. Note that adaptive spectral mapping module 416 may include an adaptive spectral mapping control 418 that determines an adaptive spectral map (ASM) 420, which is used by adaptive spectral mapping engine (or circuit) 422." should read -- The adaptive spectral map may be determined by a variety of inputs. This is shown in FIG. 6, which presents a block diagram illustrating an example of an integrated circuit 600 in an electronic device (such as electronic device 110-1 in FIG. 1). In particular, adaptive spectral map 420 may depend on or may be based on a combination of static and dynamic information, such as any/all of: link information 612 provided by link controller 610, host information 616 provided by system and application controller 614 (such as a host processor), and/or spectral utilization information 618 provided by RF measurement control module 620 in radio/modem 428. --.

In the Claims

In Claim 9, at Column 21, Line 15: "wherein" should read -- wherein: --.

Signed and Sealed this  
Thirteenth Day of October, 2020

Andrei Iancu  
*Director of the United States Patent and Trademark Office*